United States Patent [19]

Langner, Jr.

[11] Patent Number: 5,179,285
[45] Date of Patent: Jan. 12, 1993

[54] AUTOMATICALLY PROCESSED ALPHA-TRACK RADON MONITOR

[75] Inventor: G. Harold Langner, Jr., Mack, Colo.

[73] Assignee: The United States of America as represented by the United States Department of Energy, Washington, D.C.

[21] Appl. No.: 694,738

[22] Filed: May 2, 1991

[51] Int. Cl.$^5$ .............................................. G01T 1/02
[52] U.S. Cl. ............................. 250/473.1; 250/472.1; 250/253; 250/255
[58] Field of Search .................. 250/472.1, 473.1, 253, 250/255

[56] References Cited

U.S. PATENT DOCUMENTS

| | | | |
|---|---|---|---|
| Re. 33,065 | 9/1989 | Alter et al. | 250/472.1 |
| 3,505,523 | 4/1970 | Becker | 250/473.1 |
| 4,920,272 | 4/1990 | Yoder | 250/475.2 |
| 4,954,716 | 9/1990 | Wheeler | 250/482.1 |

Primary Examiner—Carolyn E. Fields
Attorney, Agent, or Firm—Mark P. Dvorscak; Robert J. Fisher; William R. Moser

[57] ABSTRACT

An automatically processed alpha-track radon monitor is provided which includes a housing having an aperture allowing radon entry, and a filter that excludes the entry of radon daughters into the housing. A flexible track registration material is located within the housing that records alpha-particle emissions from the decay of radon and radon daughters inside the housing. The flexible track registration material is capable of being spliced such that the registration material from a plurality of monitors can be spliced into a single strip to facilitate automatic processing of the registration material from the plurality of monitors. A process for the automatic counting of radon registered by a radon monitor is also provided.

3 Claims, 1 Drawing Sheet

5,179,285

AUTOMATICALLY PROCESSED ALPHA-TRACK RADON MONITOR

CONTRACTUAL ORIGIN OF THE INVENTION

The United States Government has rights in this invention pursuant to Contract No. DE-AC07-86ID12584 between the U.S. Department of Energy and Chem-Nuclear Geotech.

BACKGROUND OF THE INVENTION

This invention relates generally to passive, alpha-track radon monitors, and more specifically to an alpha-track radon monitor in which the configuration of the alpha-track registration material is in the form of a flexible strip to facilitate automatic processing of the material.

Radon gas is a naturally occurring radioactive noble gas that results from the decay of radium 226. It has long been recognized that exposure to radon gas (and radon gas daughters that occur as a result of radon gas decay) can pose a significant health hazard. Although testing for radon gas has been done for many years, until relatively recently, concern over exposure to radon gas was primarily associated with workers in the uranium mining industry or others whose work brought them in contact with uranium ore. In recent years, it has also been recognized that radon gas can seep out of the ground through building foundations and can accumulate inside the buildings. When radon gas accumulates in a human environment, it is inhaled thereby exposing the lungs to radioactivity. The health hazards of radon gas exposure are associated with the increased likelihood for the development of lung cancer, which may not occur until 10 to 20 years or more after exposure. Consequently, it is now considered that naturally occurring radon gas can pose a significant health hazard to the general population. The United States Environmental Protection Agency (EPA) estimates that as many as 20,000 deaths occur each year as a result of exposure to radon gas. The U.S. Department of Energy supports the study of radon gas measurement and detection through its Office of Remedial Action and Waste Technology.

Because of the present awareness of the health hazards associated with exposure to radon gas, widespread testing programs have been undertaken and further testing programs are planned. This testing includes buildings such as homes, schools and offices. To achieve widespread testing, it is recognized that many measurements must be made. In fact, it is often considered appropriate to make several measurements in a single building at different locations within the building. The testing for radon gas is normally performed by placement of detector devices in the location to be tested. These detectors typically contain an alpha track registration material, a film which is sensitive to the radioactivity associated with radon gas. After placement of the detectors in the building being tested for an established period of time, typically on the order of several weeks to several months, the detectors are removed from the building and conveyed to a laboratory. At the laboratory, the detectors are analyzed with suitable equipment for the detection and measurement of radon gas. From this analysis a determination of the presence and concentration of radon gas in the building being tested can be inferred.

Typically, exposed registration material is developed by etching with NaOH, and then the developed film is counted by optical or spark counting techniques. Optical counting employs an optical system such as a microscope to magnify the developed alpha-track images so that they can be counted either manually or with automatic counting equipment. Spark counting employs the counting of voltage or current pulses generated by discharges through the etched track in the registration material placed between electrodes. Spark counting techniques however, require the use of registration material having no supporting backing. It is necessary that the material be unbacked so that the holes produced go through the film such that the sparks generated can be counted.

Alpha-track registration material is typically planar. Such material as described or used in U.S. Pat. Nos. 4,778,992, 4,920,272, or Re. 33,065, consists of a rectangular piece of cellulose nitrate in which one or both sides of the film can be exposed to a radon containing environment. After exposure to this environment, the film is individually processed and then the alpha-particle tracks from radon are counted using conventional techniques. Current processing and counting techniques result in a time lag from exposure to counting. Additionally, the use of planar film configurations does not always provide a uniform track distribution. The use of optical counting techniques is time consuming and labor intensive. Further, the use of spark counting techniques can possibly result in a build-up of static charges and cause inconsistent readouts.

Accordingly, it is an object of the present invention to provide a radon monitor in which results from exposure of track registration material can be timely processed.

It is another object of the present invention to provide a radon monitor in which the track registration material provides a uniform track distribution to result in greater radon counting accuracy.

A further object of the present invention is to permit the efficient counting of greater numbers of tracks to improve the sensitivity and accuracy of radon measurement.

Another object of the present invention is to provide a radon track registration material which is flexible, configured to provide a greater degree of counting accuracy, and which is capable of being combined with material from a plurality of monitors to facilitate automatic processing.

SUMMARY OF THE INVENTION

This invention provides an automatically processed alpha-track radon monitor comprising a monitor housing top and bottom portions. The top portion includes an aperture allowing radon entry into the housing. A filter intermediate the top and bottom housing portions excludes the entry of radon daughters into the housing. A flexible track registration material is located within the housing that records alpha-particle emissions from the decay of radon and radon daughters inside the housing. An identification means can be included on the flexible track registration material. The flexible track registration material is capable of being spliced such that the registration material from a plurality of monitors can be spliced into a single strip to facilitate automatic processing of the registration material from the plurality of monitors.

In a radon monitor including a housing having an aperture allowing radon entry into the housing and a filter for excluding the entry of radon daughters into the housing, an improvement over conventional configurations, an apparatus is provided which facilitates the automatic counting of radon registered by the monitor comprising a flexible strip of alpha-track registration material located within the housing. The strip of registration material is capable of being spliced such that the registration material from a plurality of monitors can be spliced into a single elongated strip to facilitate automatic processing of the plurality of registration materials.

A process for the automatic counting of radon registered by a radon monitor is also provided which comprises providing a flexible strip of alpha-track registration material capable of recording alpha-particle emissions from the decay of radon and radon daughters in a housing which is permeable to radon but which is impermeable to radon daughters; placing a plurality of said housings having registration material in a radon containing environment for a period of time to monitor for the presence and amount of radon in the environment; removing the strip after radon monitoring from each housing and splicing the strip to a plurality of other strips to form a single elongated strip; and feeding the single elongated strip of registration material through a processing means which reveals the alpha-tracks on the material and counts the alpha-tracks to provide a measurement of the amount of radon in the monitored area. The process can also include the step of reading a computer readable identification code placed on each flexible strip of registration material. The single elongated strip of registration material is capable of being processed automatically.

BRIEF DESCRIPTION OF THE DRAWINGS

The above-mentioned and other features of the invention will become more apparent and be best understood, together with the description, by reference to the accompanying drawing, in which.

DETAILED DESCRIPTION OF THE INVENTION

Figure 1:
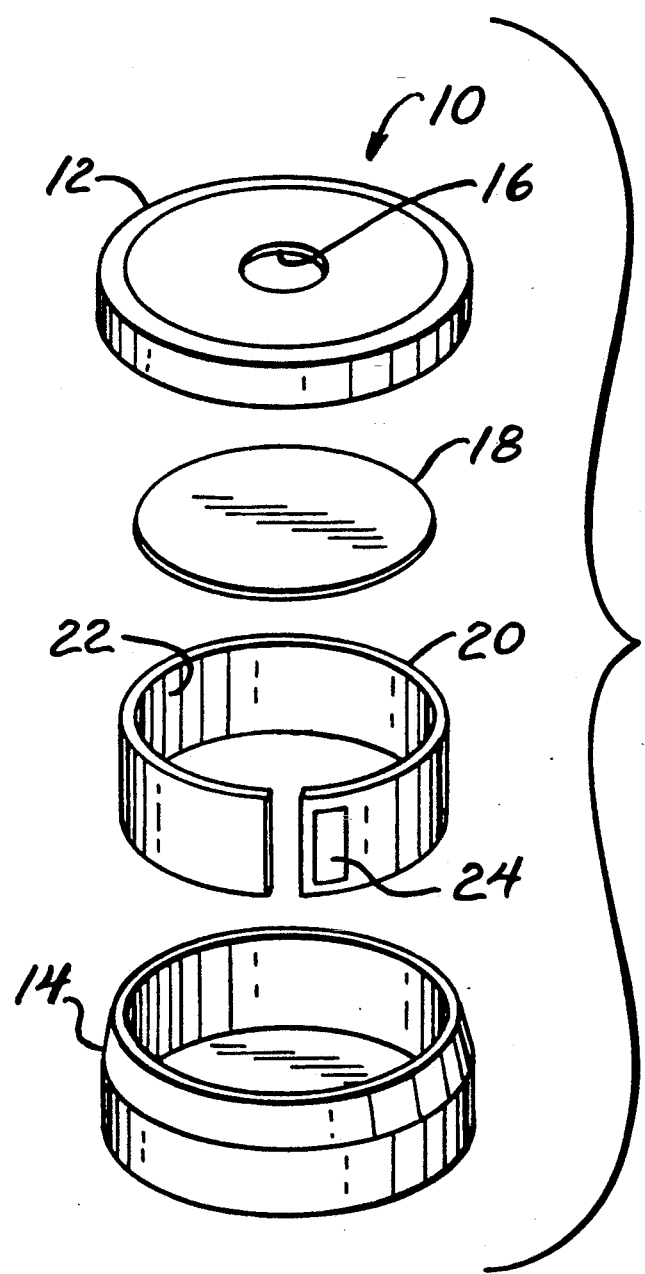
FIG. 1 is an exploded view of an automatically processed alpha-track radon monitor having flexible registration material.

Referring to FIG. 1, an exploded view of an automatically processed alpha-track radon monitor 10 is shown. The radon monitor 10 includes a housing having a top portion 12 and bottom portion 14. The housing portions 12 and 14 are preferably cylindrical and provide an air-tight seal. An aperture 16 in the top housing portion 12 is permeable to radon, to allow radon to diffuse from the environment surrounding the monitor into its interior. The aperture 16 through which the radon diffuses may be covered with a filter 18 which is permeable to radon, but impermeable to radon daughters such that radon daughters are prevented from diffusing into the interior of the housing. The filter 18 can be a porous material such as filter paper, or it can be a solid material such as rubber.

Located within the monitor 10 is a detector strip 20. Preferably, the detector strip is a piece of alpha-track registration material. The registration material 20 records alpha-particle emissions from the decay of radon and radon daughters inside the housing. The registration material 20 is a film having 2 layers: a thick polyester layer to provide strength and a 12 micron layer of cellulose nitrate containing a red pigment. Preferably, the registration material 20 is Kodak LR 115 type II nuclear track registration film. This film is commercially available in standard 9 by 12 cm sheets. Strips in the range of about 14 by 100 mm to 16 by 120 mm can be cut from the sheets to constitute individual detector strips for placement in individual monitors 10. The registration material 20 has an active side 22 on which the alpha particle emissions are recorded. Also included on the registration material 20 is a computer readable identification code 24, such as a laser bar code, to read sample identifications from individual strips.

It is preferred that the registration material 20 be substantially non-planar, and that it constitute a virtual liner for the housing 14. Specifically, it is contemplated that the registration material 20 is in the form of a flexible strip that is fitted to the inside circumference of the monitor 10 and has a cylindrical shape during exposure to the radon containing environment. A substantially non-planar or cylindrical configuration of the registration material provides a more uniform distribution and accurate measurement of the alpha-tracks compared to planar configurations.

Individual detector strips 20 are each loaded into a plurality of monitors 10 and subsequently deployed to a radon containing environment for exposure times ranging from 7 days to 1 year. Following exposure the monitors are retrieved and the detector strips 20 are removed and processed to reveal the tracks acquired during exposure. The detector strips 20 can be processed by conventional etching means, i.e. by insertion in NaOH to remove approximately one-half of the original 12 micron thickness of cellulose nitrate.

After etching the individual detector strips are then spliced together to form a continuous roll of detector material ranging in length from a single detector strip up to 400 individual detector strips. The roll is then fed into an automated system which is capable of counting the number of tracks in a standard area for each individual detector strip. This process reveals the alpha-tracks on the material and automatically counts the alpha-tracks to provide a measurement of the amount of radon in the monitored area.

The foregoing description of preferred embodiments of the invention has been presented for purposes of illustration and description. It is not intended to be exhaustive or to limit the invention to the precise form disclosed, and obviously many modifications and variations are possible in light of the above teaching. The embodiments were chosen and described to best explain the principles of the invention and its practical application and thereby enable others skilled in the art to best utilize the invention in various embodiments and with various modifications as are suited to the particular use contemplated. It is intended that the scope of the invention be defined by the claims appended hereto.

The embodiments of the invention in which exclusive property rights or privileges are claimed are defined as follows:

1. A process for the automatic counting of radon registered by a radon monitor comprising:
   a) providing a flexible strip of alpha-track registration material capable of recording alpha-particle emissions from the decay of radon and radon daughters in a housing which is permeable to radon but which is impermeable to radon daughters;
   b) placing a plurality of said housings having registration material in a radon containing environment for a period of time to monitor for the presence and amount of radon in the environment;

c) removing the strip after radon monitoring from each housing and splicing the strip to a plurality of other strips to form a single elongated strip;

d) feeding the single elongated strip of registration material through a processing means which reveals the alpha-tracks on the material and counts the alpha-tracks to provide a measurement of the amount of radon in the monitored area.

2. The radon monitoring process of claim 1 including the step of reading a computer readable identification code placed on each flexible strip of registration material.

3. The radon monitoring process of claim 2 wherein the single elongated strip of registration material is automatically processed.

* * * * *